United States Patent [19]

Knapp et al.

[11] Patent Number: 4,617,796
[45] Date of Patent: Oct. 21, 1986

[54] SLEEVE VALVE FOR A PULSED GAS GENERATOR

[75] Inventors: Janet S. Knapp, Simi Valley, Calif.; Jerry L. Hillman, Langlois, Oreg.

[73] Assignee: Rockwell International Corporation, El Segundo, Calif.

[21] Appl. No.: 713,209

[22] Filed: Mar. 18, 1985

[51] Int. Cl.$^4$ ............................................. F02K 7/06
[52] U.S. Cl. ..................................... 60/39.79; 60/247
[58] Field of Search .................... 60/233, 39.76, 39.77, 60/39.78, 39.79, 39.8, 39.81, 247, 248, 249, 221, 222

[56] References Cited

U.S. PATENT DOCUMENTS

| | | | |
|---|---|---|---|
| 2,714,800 | 8/1955 | Gongwer | 60/221 |
| 3,060,682 | 10/1962 | Kemenczky | 60/247 |
| 3,264,824 | 8/1966 | Bost | 60/247 |
| 3,279,178 | 10/1966 | Kemenczky | 60/221 |
| 4,258,546 | 3/1981 | Stratton | 60/259 |

Primary Examiner—Louis J. Casaregola
Attorney, Agent, or Firm—H. Fredrick Hamann; Harry B. Field; Lawrence N. Ginsberg

[57] ABSTRACT

The combination of a pulsed rocket engine 12 and a sleeve valve 10 coupled to the engine output and receiving in its internal chamber 16 the gas generated by the engine 12. The sleeve valve 10 has a movable sleeve 24 with ports 26, 28 therethrough surrounding the wall 18 of the chamber 16, the wall 18 having ports 38, 40 which axially align with the sleeve ports 26, 28 in the valve's open position to allow rapid discharge of the contents of the chamber 16. The sleeve is ordinarily biased to a closed, or non-aligned, position for the ports by a spring 32. When the gas pressure in the chamber 16 reaches a predetermined amount, a pressure sensor 54 commands a gas source to send pressurized gas into the valve 10 to force the sleeve 24 into its open position against the bias of the spring 32, thereby aligning the ports 26, 28 and 38, 40 and allowing rapid discharge of the gas from the sleeve-valve chamber 16.

6 Claims, 1 Drawing Figure

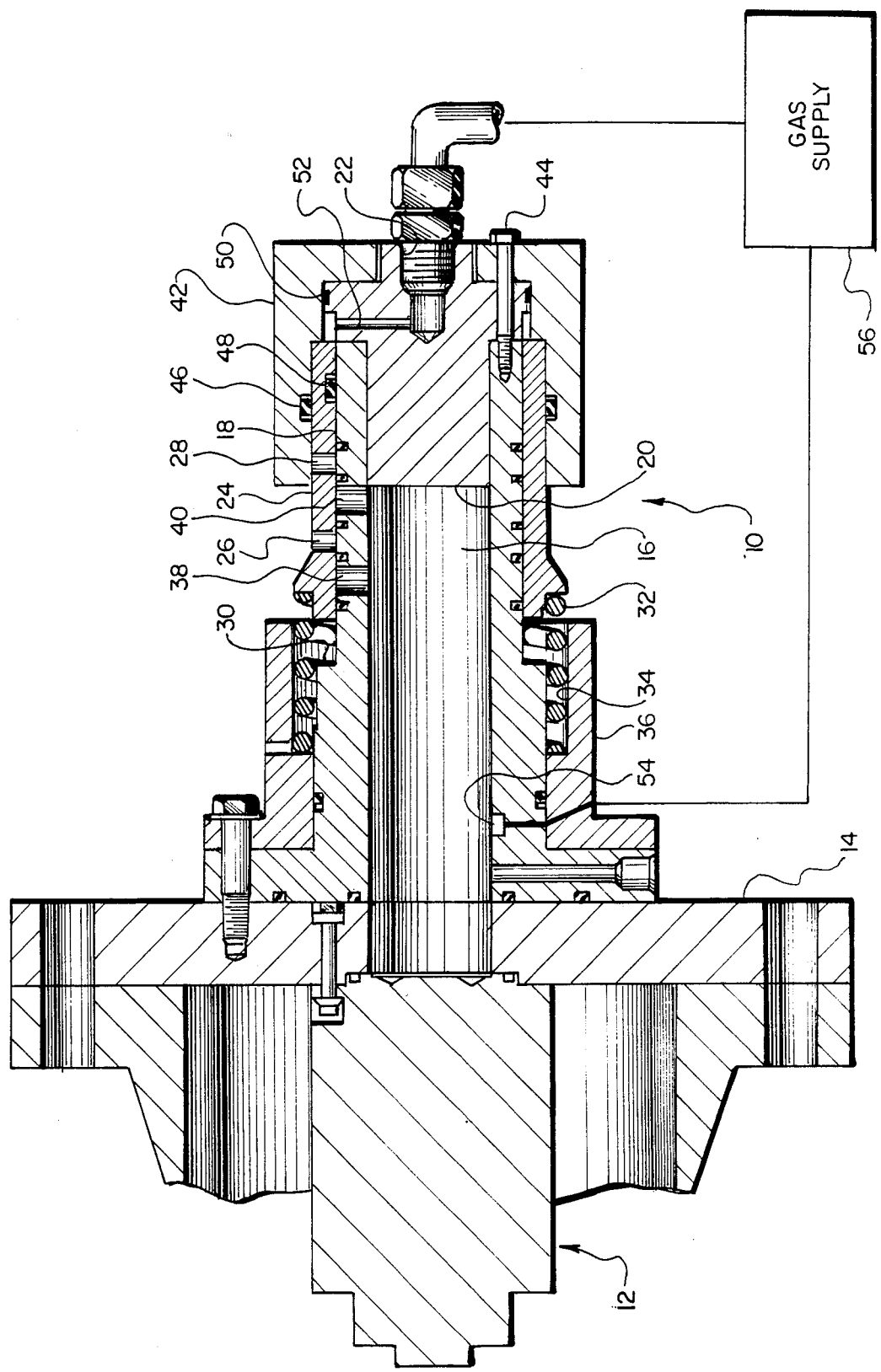

4,617,796

SLEEVE VALVE FOR A PULSED GAS GENERATOR

BACKGROUND OF THE INVENTION

1. Field of the Invention

This invention relates to a sleeve valve to be used in conjunction with a pulsed gas generator, especially a pulsed rocket engine for underwater acoustic applications.

2. Description of the Prior Art

It has been proposed that the pulsed rocket engine, designated the "Hippe", produced by the Rockwell International Corporation, Canoga Park, Calif., be utilized as an underwater sonic source. One version of this engine is described in U.S. Pat. No. 4,258,546, issued Mar. 31, 1981 to H. S. Stratton. The engine can deliver a 3–10 msec pulse of exhaust gas at chosen pressures up to about 15,000 psi. However, it has been found that a pulse of pressure enduring for such a length of time tends to be absorbed by the large volume of water into which the pulse is delivered rather than to generate a useful acoustic wave, i.e., that the acoustic pressure wave does not attain as high an amplitude as it would with a shorter delivery time.

OBJECTS OF THE INVENTION

An object of the invention is to maximize the acoustic pressure of a pulsed rocket engine which delivers its chamber output gas into an aqueous environment.

Another object is to allow engine combustion in a pulsed rocket engine which discharges into an aqueous environment to occur without the presence of water during pressure buildup.

A further object is to provide rapid discharge of a desired portion of the total gas volume at a desired pressure.

Yet another object is to rapidly discharge a disired portion of the total gas volume of a pulsed rocket engine into an aqueous medium at a desired pressure.

Other objects, advantages and novel features of the present invention will become apparent from the following detailed description of the invention when considered in conjunction with the accompanying drawing.

SUMMARY OF THE INVENTION

The objects and advantages of the present invention are achieved by connecting a sleeve valve to the exhaust end of the combustion chamber of a pulsed rocket engine, preferably the Hippe engine. The valve operates to keep the outlet ports closed in the chamber wall of the valve by means of a spring-biased sleeve while the propellants fed to the engine's combustion chamber are burned and then to open the ports when a predetermined pressure is reached in the combustion chamber, allowing a sudden pulse of gas at the predetermined pressure and volume to exit from the valve.

BRIEF DESCRIPTION OF THE DRAWINGS

The single FIGURE is an axial cross-section of a sleeve valve, in accordance with the invention, shown schematically connected to a pulsed gas generator.

The same elements or parts throughout the figures of the drawing are designated by the same reference characters.

DETAILED DESCRIPTION OF THE INVENTION

The FIGURE provides an axial cross-sectional view of a sleeve valve 10 and a schematic view of a pulsed rocket engine, used as the gas generator 12 to the output end of which the valve 10 is coupled through a flange coupler 14.

The gas generator is, preferably, a Hippe engine which is a product of the Rockwell International Corporation, Canoga Park, Calif., an embodiment of which is described in U.S. Pat. No. 4,258,546, issued Mar. 31, 1981, to Harold S. Stratton, which patent is incorporated herein by reference. Gas is generated by this engine in repetitive pulses, generally about 10 msecs. in duration, at a variable rate of up to about 60 pps. The underwater frequency band of the pulser is about 25–250 Hz. The output thrust of the engine can be as much as 10,000 lbs. with a chamber pressure of up to 30,000 psia or more.

The sleeve valve 10 is essentially tubular in construction, although it may have other shapes, such as rectangular, in the direction transverse to the longitudinal axis. A central chamber 16 is formed by a tubular chamber wall 18 and a chamber end plug 20 which closes off the end of the chamber 16. A bore 22 extends partially into the plug 20 from the downstream (with reference to the flow of gas from the gas generator 12) end.

A sleeve 24 fits over the outside of the chamber wall 18. The sleeve 24 has a pair of opening ports 26, 28 in it and can be moved upstream as far as a shoulder 30 in the chamber wall 18. A spring 32 sits in a space 34 between the downstream side of the outside of the chamber wall 18 and a cylinder 36 which fits snugly over the outside of the chamber walls 18. The spring 32 exerts a downstream bias force on the sleeve 24 keeping the sleeve ports 26, 28 closed off from a pair of ports 38, 40 in the chamber wall 18.

A tubular cap 42 is placed around the downstream end of the plug 20 and fastened to the end of the chamber wall 18 by means of bolts 44.

The contact areas between the cap 42, the sleeve 24, the chamber wall 18 and the plug 20 are sealed against flow of gas or outside fluid by means of a plurality of seals such as O-rings, seal rings, channel seals, etc., as shown by elements 46, 48 and 50.

A channel 52 connects the actuation port 22 with the downstream end of the space between the cap 42 and the chamber wall 18, within which space the sleeve 24 slides.

A pressure sensor 54 is placed in the chamber wall 16, although it may be placed within the combustion chamber wall of the Hippe engine 12. The sensor 54 is electrically connected to control a gas source 56 the output of which is fed into the actuation port 22 in the plug 20.

In operation, the Hippe engine is fired and the gas output fills the chamber 16 of the sleeve valve 10. The pressure therein is sensed by the pressure sensor 54 and when the pressure reaches a preselected level (e.g., 6000 psia), a signal is sent to the gas source 56 commanding it to release gas into the actuation port 22. This gas has a pressure acting against the sleeve area to create a force sufficiently higher than the spring force to quickly move the sleeve 24 upstream to the chamber shoulder 30. This action also axially aligns the sleeve ports 26, 28 with the chamber-wall ports 38, 40, respectively, allowing the gas in the chamber 16 to suddenly discharge to the environment surrounding the sleeve valve 10.

The fast-acting sleeve valve described herein, among other things:

(1) allows engine combustion to occur without the presence of water during initial pressure build-up, a factor that contributes to achieving high pressure from the engine combustion chamber, since the presence of water causes slow ignition by quenching the combustion process.

(2) eliminates the time required to build chamber pressure (rise time of the gas pulse) since the output pulse is released from the sleeve valve after the preselected pressure and volume is reached; and (3) provides a rapid discharge of the predetermined gas volume at a desired pressure.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In combination with a rocket-engine gas generator in an aqueous environment,
 a sleeve valve formed with a chamber wall and an end plug which define an internal chamber, the chamber being coupled to receive the output of the gas generator, the chamber wall having at least one port therethrough, a movable sleeve fitting around the outside of said chamber wall and having at least one port therethrough, and a force/balance bias means for maintaining the position of the sleeve so that its port is not axially aligned with the chamber-wall port whereby the latter is closed prior to the valve being activated;
 pressure sensor means in the internal chamber for sensing the gas pressure therein; and
 gas source means coupled to receive the output signal of the pressure sensor and to supply pressurized gas to the sleeve valve to move the sleeve axially against the force of the bias means so that the sleeve port aligns with the chamber-wall port to allow rapid discharge of the gas within the internal chamber when the internal chamber pressure and volume reaches a predetermined level.

2. The combination of claim 1, wherein:
said gas generator is pulsed.

3. The combination of claim 1, wherein:
said gas generator comprises a pulsed rocket engine.

4. The combination of claim 1, wherein:
said gas generator comprises a Hippe engine.

5. The combination of claim 2, wherein:
the plug is formed with an actuation-port bore in its downstream end to receive the gas from the gas source and with a channel from the bore to a plug surface in contact with the sleeve so that the pressure of the gas from the gas is brought to bear on the actuating area of the sleeve.

6. The combination of claim 3, wherein:
the plug is formed with a port in its downstream end to receive the gas from the gas source and with a channel from the bore to a plug surface in contact with the sleeve so that the pressure of the gas from the gas source is brought to bear on the sleeve.

* * * * *